No. 781,211. PATENTED JAN. 31, 1905.
T. KINKADE.
GLASS CUTTER.
APPLICATION FILED NOV. 16, 1904.
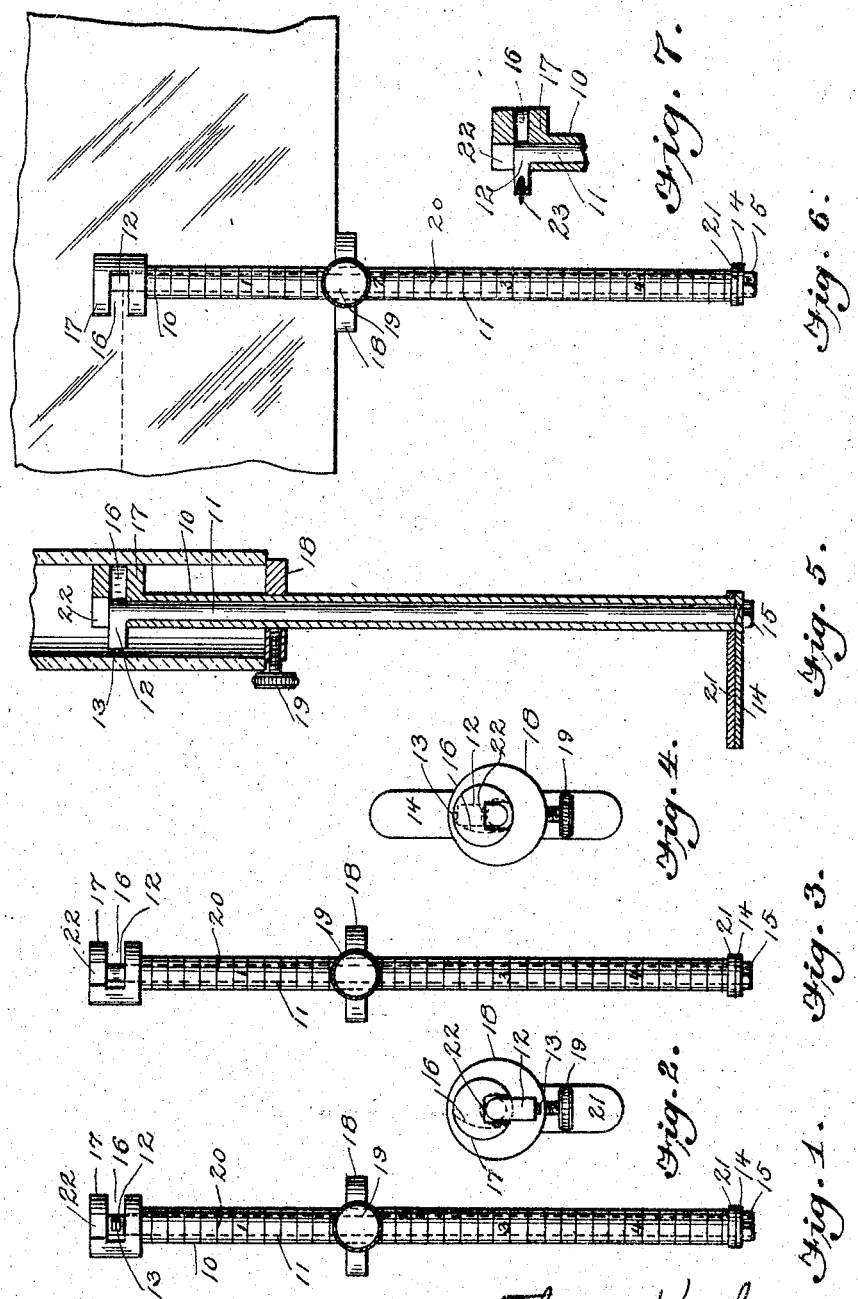
Witnesses
F. A. Barron.
M. A. Schmidt.
Thomas Kinkade, Inventor
by
Milo B. Stevens & Co. Attorneys.

No. 781,211. Patented January 31, 1905.

UNITED STATES PATENT OFFICE.

THOMAS KINKADE, OF ROCK SPRINGS, WYOMING.

GLASS-CUTTER.

SPECIFICATION forming part of Letters Patent No. 781,211, dated January 31, 1905.

Application filed November 16, 1904. Serial No. 233,015.

*To all whom it may concern:*

Be it known that I, THOMAS KINKADE, a citizen of the United States, residing at Rock Springs, in the county of Sweetwater and State of Wyoming, have invented new and useful Improvements in Glass-Cutters, of which the following is a specification.

My invention relates to a glass-cutter, and has for its object to provide a simple and handy tool of this kind for cutting glass tubes of different diameters and which can also be employed for cutting sheets or panes of glass.

A further object is to provide a gage attachment, together with other novel and improved features of construction, as will be fully described hereinafter.

In the accompanying drawings, Figure 1 is a plan view of the tool, and Fig. 2 and end view thereof. Fig. 3 is a plan view showing the cutter in another position, and Fig. 4 is an end view thereof. Fig. 5 is a longitudinal sectional view showing the operation of the tool in cutting a tube. Fig. 6 shows the manner in which the tool is employed for cutting a sheet or pane of glass. Fig. 7 is a sectional detail of a modification.

Referring specifically to the drawings, 10 denotes a tubular casing, and 11 the shaft of the cutter, which fits in said casing. One end of the shaft extends outside the casing and is bent sidewise, as at 12, to extend at substantially right angles to the shaft, its outer end having a cutting-point 13. The shaft 11 also projects from the opposite end of the casing 10 and has an operating-handle 14, which fits on a squared portion of the shaft and is secured by a nut 15. The lateral extension 12 fits in a recess 16, which is made in an enlargement 17 of the casing 10 at the end thereof. This enlargement is circular and is arranged eccentric with respect to the longitudinal axis of the shaft 11, so that when the shaft is rotated in one direction the extension projects outside the recess, as shown in Figs. 1, 2, and 5, this being the operating position of the cutter. When the shaft is rotated in the opposite direction, the extension swings back into the recess and is entirely inclosed thereby.

A gage-sleeve 18 fits on the casing 10, said sleeve being locked in adjusted position by a set-screw 19, and the casing has graduations 20, so that the length of the parts to be cut can be gaged. A handle for the casing is indicated at 21, which handle is adjacent the operating-handle 14.

To cut a glass tube, the parts are arranged as shown in Figs. 3 and 4 and the tool is inserted. The operating-handle 14 is then taken hold of and the extension 12 is swung around until its cutting-point 13 engages the inside of the tube, as shown in Fig. 5. As the enlargement 17 is in contact with the inside of the tube, the cutting-point can be firmly pressed against the glass to take hold thereof. After the glass is cut the cutter can be removed from the tube by turning the operating-handle in the opposite direction and retracting the extension, as heretofore described, and shown in Figs. 3 and 4. The length of the glass to be cut is gaged by placing the end of the tube against the sleeve 18 after the arm is adjusted. Tubes of various sizes can be cut by the tool, the smallest which can be cut being a tube having the same diameter as that of the enlargement 17. The size of the larger tubes which it can cut depends on and is limited by the extent to which the extension 12 projects beyond the recess 16. To cut a sheet or pane of glass, the gage is set according to the width of the strip to be cut and placed on the edge of the sheet, as shown in Fig. 6. The extension is swung around as before until its cutting-point engages the glass.

An opening or slot 22 extends from the outer end of the enlargement 17 to the opening 16. The said opening 22 is in alinement with the extension to permit assembly of the parts and also the ready removal of the extension for sharpening the cutting-point.

In the modification shown in Fig. 7 the part 12 of the shaft is fitted with a cutter-wheel 23 instead of a cutting-point 13.

The tool is simple in construction and can be cheaply made and sold, and it well serves the purpose for which it is intended.

What I claim as new, and desire to secure by Letters Patent, is—

1. A glass-cutter comprising a rotatable shaft having at one end a cutter projecting laterally therefrom; and a tubular casing inclosing the shaft and having at one end a recessed enlargement in which the cutter works, said enlargement being arranged eccentrically with respect to the longitudinal axis of the shaft.

2. A glass-cutter comprising a rotatable shaft having at one end a lateral extension provided with a cutter; a tubular casing inclosing the shaft and having at one end a recessed enlargement in which the extension works, said enlargement being arranged eccentrically with respect to the longitudinal axis of the shaft.

3. A glass-cutter comprising a rotatable shaft having at one end a lateral extension provided with a cutter; a graduated tubular casing inclosing the shaft and having at one end a recessed enlargement in which the extension works, said enlargement being arranged eccentrically with respect to the longitudinal axis of the shaft; and a gage-sleeve mounted on the casing.

4. A glass-cutter comprising a rotatable shaft having at one end a rotary cutter projecting laterally therefrom; and a tubular casing inclosing the shaft and having at one end a recessed enlargement in which the cutter works, said enlargement being arranged eccentrically with respect to the longitudinal axis of the shaft.

In testimony whereof I have signed my name to this specification in the presence of two subscribing witnesses.

THOMAS KINKADE.

Witnesses:
SAM JENSEN,
H. P. NELSON.